United States Patent
Zhang

(10) Patent No.: US 10,970,846 B1
(45) Date of Patent: Apr. 6, 2021

(54) REPAIRING METHOD FOR MURA IN DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Hua Zhang, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 497 days.

(21) Appl. No.: 16/077,422

(22) PCT Filed: Mar. 20, 2018

(86) PCT No.: PCT/CN2018/079522
§ 371 (c)(1),
(2) Date: Aug. 10, 2018

(87) PCT Pub. No.: WO2019/144482
PCT Pub. Date: Aug. 1, 2019

(30) Foreign Application Priority Data

Jan. 27, 2018 (CN) .......................... 201810079844.8

(51) Int. Cl.
*G06T 7/13* (2017.01)
*G06T 7/00* (2017.01)
(Continued)

(52) U.S. Cl.
CPC .............. *G06T 7/13* (2017.01); *G02F 1/1309* (2013.01); *G06T 7/0004* (2013.01); *G06T 7/12* (2017.01);
(Continued)

(58) Field of Classification Search
CPC .............. G06K 9/00214; G06K 9/6206; G06T 2207/10068; G06T 2207/10024
See application file for complete search history.

(56) References Cited

U.S. PATENT DOCUMENTS

| 7,161,558 B1 * | 1/2007 | Eidem | ...................... G09G 3/22 345/3.1 |
| 7,215,418 B2 * | 5/2007 | Gahagan | ................ G01N 21/41 356/237.2 |

(Continued)

*Primary Examiner* — Yosef Kassa
(74) *Attorney, Agent, or Firm* — Leong C. Lei

(57) ABSTRACT

The present disclosure relates to a repairing method for Mura in a display panel, including: configuring a rectangular-shaped first black area in a first image displayed in a display region of a display panel to be a width of a first predetermined pixel, determining a boundary "a" of the white area, configuring a second white area in a second image displayed in the display region of the display panel to be a width of a second predetermined pixel, determining a boundary "b" of the black area, obtaining a boundary "c" of an actual-displaying image of the display panel according to a width of a third predetermined pixel within an image captured by a charge couple device (CCD), cutting the image captured by the CCD along the boundary "c", and conducting a Mura repairing process on the image which has been cut down.

5 Claims, 5 Drawing Sheets

(51) Int. Cl.
*G06T 7/12* (2017.01)
*G02F 1/13* (2006.01)
*H04N 5/372* (2011.01)

(52) U.S. Cl.
CPC ............... *G06T 2207/20132* (2013.01); *G06T 2207/30121* (2013.01); *H04N 5/372* (2013.01)

(56) References Cited

U.S. PATENT DOCUMENTS

| | | | | |
|---|---|---|---|---|
| 7,630,071 | B2* | 12/2009 | Park | G01N 21/958 |
| | | | | 356/237.2 |
| 7,859,504 | B2* | 12/2010 | Furihata | G09G 3/3655 |
| | | | | 345/98 |
| 8,160,351 | B2* | 4/2012 | Sandstrom | G03F 1/84 |
| | | | | 382/149 |
| 9,076,363 | B2* | 7/2015 | Yin | G01J 3/18 |
| 9,519,164 | B2* | 12/2016 | Al-Dahle | G02F 1/13338 |

* cited by examiner

REPAIRING METHOD FOR MURA IN DISPLAY PANEL

RELATED APPLICATIONS

The present application is a National Phase of International Application Number PCT/CN2018/079522, filed Mar. 20, 2018, and claims the priority of China Application No. 201810079844.8, filed Jan. 27, 2018.

TECHNICAL FIELD

The present disclosure relates to liquid crystal display (LCD) field, more particularly to a repairing method of Mura in a display panel.

BACKGROUND

With the development of the three-dimensional display technology, high-resolution has been greatly demanded. Liquid crystal panel is the main component to achieve the high-resolution.

The offset generated during the manufacturing process of liquid crystal display (LCD) panel and the characteristic differences between liquid crystal molecules may cause the differences of brightness between each position of the LCD panel when displaying in a fixed grayscale value, resulting in non-uniform brightness of the display panel, which referred to as Mura effect.

Conventionally, the Mura repairing system of the LCD panel mainly includes a camera and a corresponding software algorithm. The Mura condition in the grayscale value of the LCD panel is captured by the camera, and the software is configured to perform an image processing calculation process basing on the brightness of the central area of the panel. The software is further configured to obtain the brightness difference between the surrounding area and the center area, so as to obtain the compensating grayscale value indicating that the brightness required to be adjusted at the Mura position under the current grayscale value (the grayscale value of the dark area requires to be increased, and the compensating data is positive; the grayscale value of the bright area requires to be reduced, and the compensating data is negative) according to the gamma curve of the panel (one-to-one correspondence curve of the brightness and the grayscale value). Then, the Mura compensating data configured to fix the positioning pixel is stored in the flash memory by the format required by the time controlling integral circuit (TCON IC). When the TCON IC starts to operate, the Mura compensating data is read from the flash memory, and the TCON IC may calculate the Mura compensating data and the input signals (grayscale value). The brightness of the panel may be adjusted by adjusting the grayscale values of each area, thereby improving the uniformity of overall brightness and darkness of the panel.

In the prior art, the Mura compensating data is one of the factors that may determine the accuracy of the Mura repairing system. That is, the grayscale value, required to be adjusted, calculated by the software according to the brightness, may determine the accuracy of the Mura repairing system. Another important factor is to accurately locate the effective display region of the LCD panel. The software may calculate the exact position of the Mura in the display region of the LCD panel, as such the correct Mura compensating data may not be associated to the wrong position.

However, light-leakages may occur at the rim of the LCD panel. When the software locates the display region of the LCD panel according to the grayscale image captured by the camera (positioning by the edge of the bright image and dark image), the light-leakage area may also be calculated as the display region of the LCD panel, causing the calculated display region of the LCD panel is greater than the actual size of the LCD panel. The calculated compensating data of the light leakage area may still be performed on the display region of the LCD panel in the actual size, which may result in compensation errors, thereby affecting the overall performance of the Mura repairing system of the LCD panel.

Therefore, it is necessary to provide a new Mura compensating method for display panels to solve the above problem.

SUMMARY

In one aspect, the present disclosure relates to a repairing method for Mura in a display panel, including: step S1, displaying a first image within a display region of the display panel when positioning the display region, wherein the first image includes a rectangular-shaped first white area configured in a middle of the first image, and a rectangular-shaped first black area, the first black area includes a rectangular ring having four band-shaped side, a width of a long side and a width of a short side of the first black area in the first image are configured to be a width of a first predetermined pixel; step S2, determining a boundary of the first white area according to a dark-bright edge of the first image from an image captured by a charge couple device (CCD) and processed by the step S1, wherein the boundary of the first white area is configured to be as "a"; step S3, displaying a second image within the display region of the display panel, wherein the second image includes a rectangular-shaped second black area configured in a middle of the second image, and a second white area, the second white area includes the rectangular ring having four band-shaped side, a width of a long side and a width of a short side of the second white area in the second image are configured to be a width of a second predetermined pixel, and the width of the second predetermined pixel is different from the width of the first predetermined pixel; step S4, determining a boundary of the second black area according to a dark-bright edge of the second image from the image captured by the CCD and processed by the step S3, wherein the boundary of the second black area is configured to be as "b"; step S5, obtaining a width of a third predetermined pixel within the image captured by the CCD according to a difference between positions of the boundary "a" of the first white area and the boundary "b" of the second black area "b" determined by a Mura compensating system, wherein the width of the third predetermined pixel is configured to be a difference between the width of the second predetermined pixel and the width of the first predetermined pixel; step S6, obtaining a boundary of an actual-displaying image of the display panel, basing on a predetermined compensation area expanding outward from the boundary "a" of the first white area, according to the width of the third predetermined pixel within the image captured by the CCD, wherein the boundary of the actual-displaying image is configured to be as "c"; step S7, cutting the image captured by the CCD along the boundary "c" of the actual-displaying image by the Mura compensating system, and conducting a Mura repairing process on the image which has been cut down.

In one example, a width of the compensation area is the same with the width of the third predetermined pixel.

In one example, the width of the second predetermined pixel is twice as the width of the first predetermined pixel.

In one example, a long side and a short side of the width of the first predetermined pixel are configured to be as 100 pixels.

In one example, a long side and a short side of the width of the second predetermined pixel are configured to be as 200 pixels.

In view of the above, the present disclosure relates to the repairing method for the Mura in the display panel. The black area in the first image displayed in the display region of the display panel is configured to be the width of the first predetermined pixel, and the boundary "a" of the black area may be determined. The white area in the second image displayed in the display region of the display panel is configured to be the width of the second predetermined pixel, and the boundary "b" of the white area may be determined. Then, the Mura compensating system is configured to determine the boundary "c" of the actual-displaying region of the display panel according to the boundary "a" and the boundary "b". As such, the boundary "c" of the actual-displaying region of the display panel may be accurately determined even if the light leakage occurs at the rim of the display panel. That is, the incorrect Mura compensation resulting from the light leakage may be avoided, and the performance of the Mura compensation of the display panel may be improved.

DETAILED DESCRIPTION

To clarify the purpose, technical solutions, and the advantages of the disclosure, embodiments of the invention will now be described more fully hereinafter with reference to the accompanying drawings.

Figure 1:
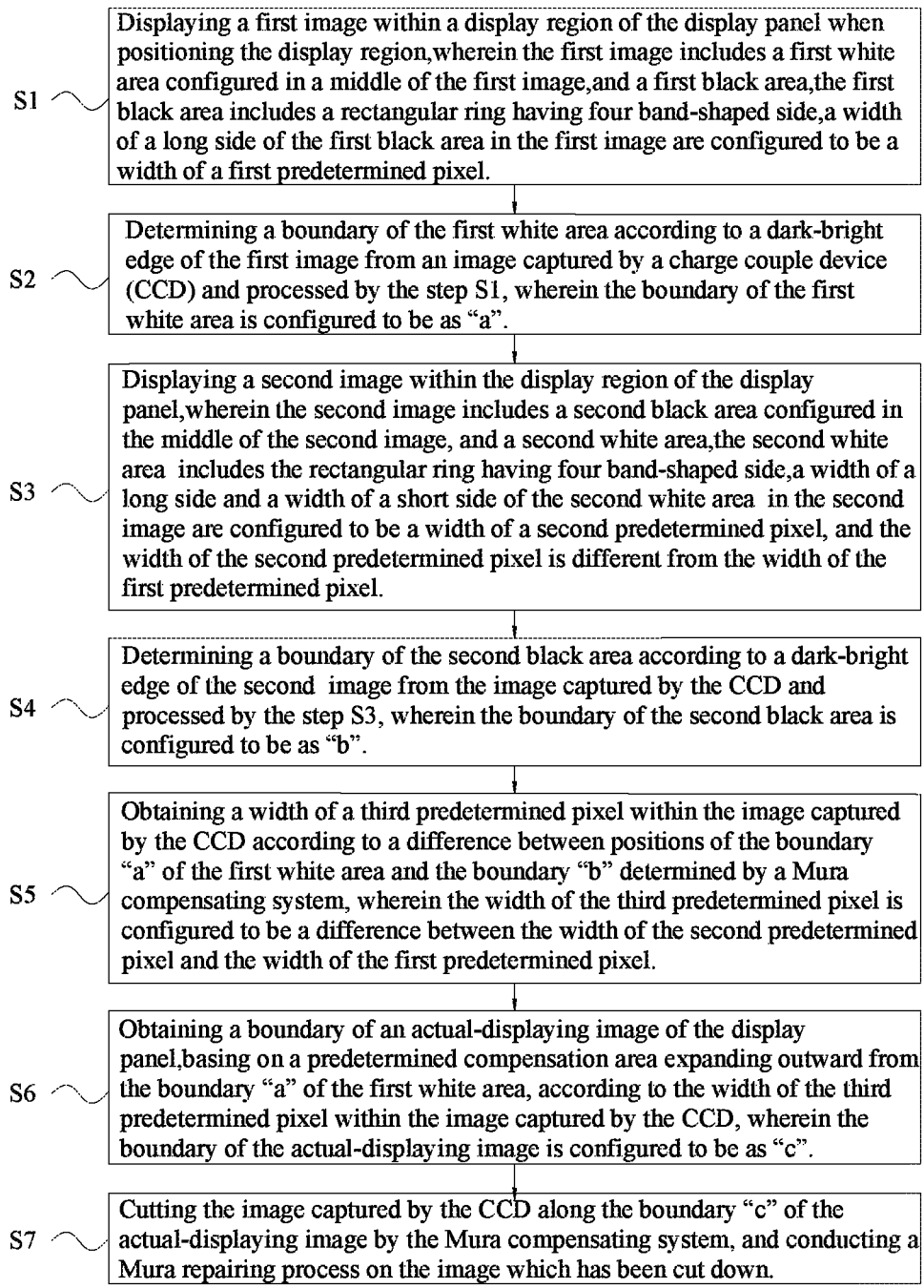
FIG. 1 is a flowchart illustrating a repairing method of Mura in a display panel in accordance with one embodiment of the present disclosure.

Referring to FIG. 1, the present disclosure relates to a repairing method of Mura in a display panel, including the following steps.

In step S1, displaying a first image of a rectangle within a display region of the display panel when positioning the display region.

Figure 2:
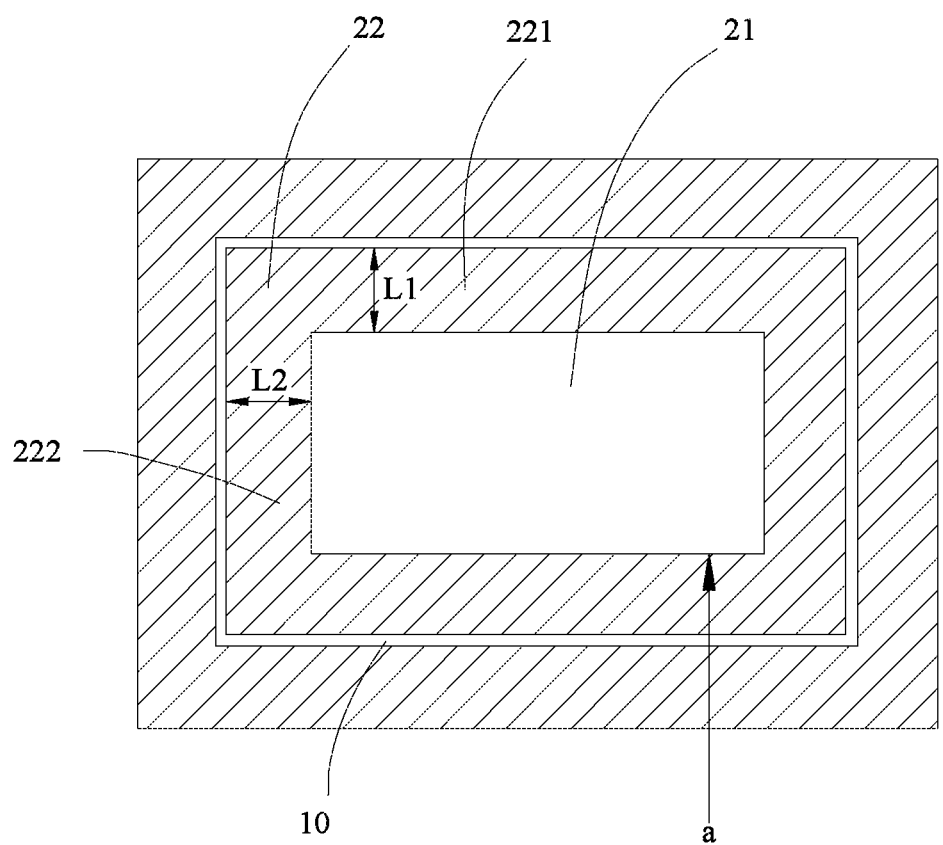
FIG. 2 is a schematic view illustrating a structure corresponding to a step S1 in the repairing method of the Mura in the display panel in accordance with one embodiment of the present disclosure.

Referring to FIG. 2, the first image includes a first white area 21 of the rectangle configured in a middle of the display region, and a first black area 22. The first white area 21 is surrounded by the first black area 22. The first black area 22 may include a rectangular ring 10 having four band-shaped side. The rectangular ring 10 indicates a rectangular structure having a rectangular hollow region configured in a middle. A width L1 of a long side 221 and a width L2 of a short side 222 of the first black area 22 in the first image are configured to be a width of a first predetermined pixel. In one example, all of liquid crystal display (LCD) images are rectangular.

It is stated that square is a special kind of rectangles. If the display region is of a square, a length of the long side is the same with a length of the short side. In one example, the width of the first predetermined pixel L2 may be a fixed pixel value. For example, the width of the long side 221 of the first black area 22 is configured to be as 100 pixels, and the width of the short side 222 of the first black area 22 is configured to be as 100 pixels. However, the present disclosure is not limited thereto, the long side 221 and the short side 222 may be different.

In step S2, determining a boundary of the first white area 21 according to a dark-bright edge, i.e., an edge of the first black area 22 and the first white area 21, of the first image from an image captured by a charge couple device (CCD) and processed by the step S1, wherein the boundary of the first white area 21 is configured to be as "a".

In step S3, similar with step S1, displaying a second image within the display region of the display panel.

Figure 3:
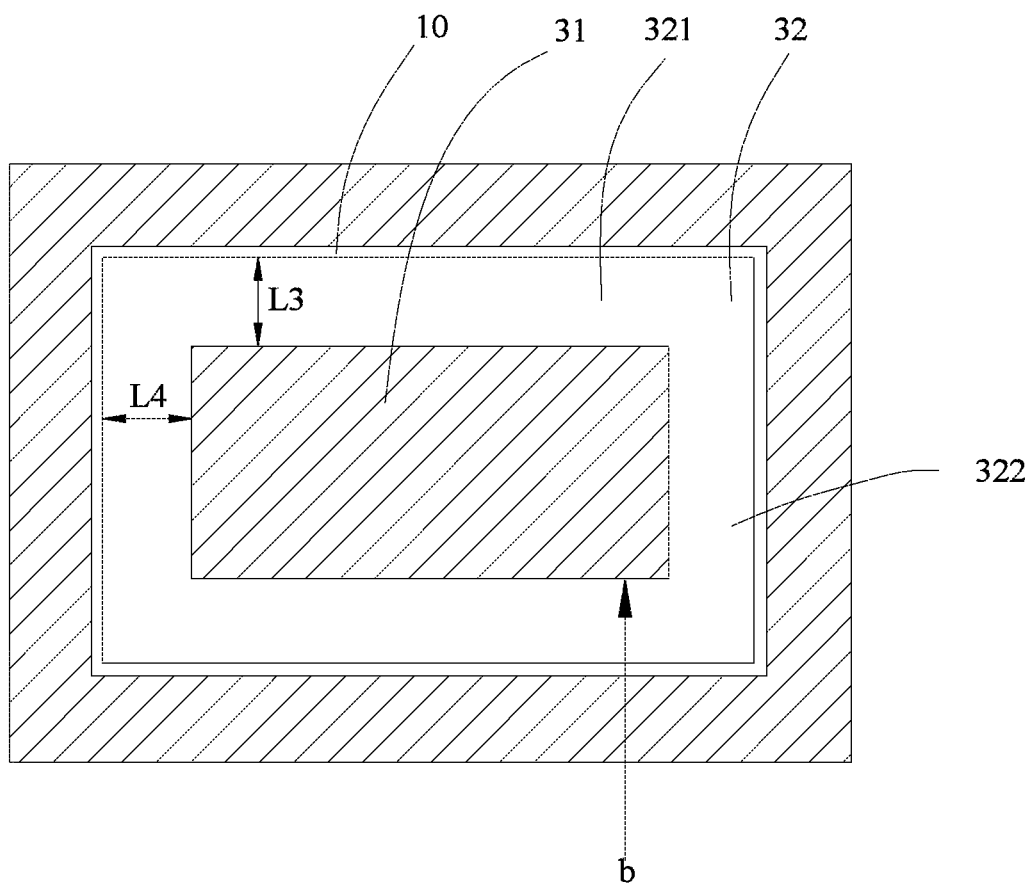
FIG. 3 is a schematic view illustrating a structure corresponding to a step S3 in the repairing method of the Mura in the display panel in accordance with one embodiment of the present disclosure.

Referring to FIG. 3, the second image includes a second black area 31 of the rectangle configured in the middle of the display region, and a second white area 32. The second black area 31 is surrounded by the second white area 32. The second white area 32 may include the rectangular ring 10 having four band-shaped side. A width L3 of a long side 321 and a width L4 of a short side 322 of the second white area 32 in the second image are configured to be a width of a second predetermined pixel.

The width of the second predetermined pixel is different from the width of the first predetermined pixel.

That is, the width of the second predetermined pixel may be greater than or less than the width of the first predetermined pixel.

In one example, the width of the second predetermined pixel may be greater than the width of the first predetermined pixel. For example, the width of the second predetermined pixel may be twice as the width of the first predetermined pixel.

That is, the width of the long side 321 of the second white area 32 may be configured to be as 200 pixels, and the width of the short side 322 of the second white area 32 may be configured to be as 200 pixels.

In step S4, determining a boundary of the second black area 31 according to a dark-bright edge, i.e., an edge of the second black area 31 and the second white area 32, of the second image from the image captured by the CCD and processed by the step S3, wherein the boundary of the second black area 31 is configured to be as "b".

Figure 4:
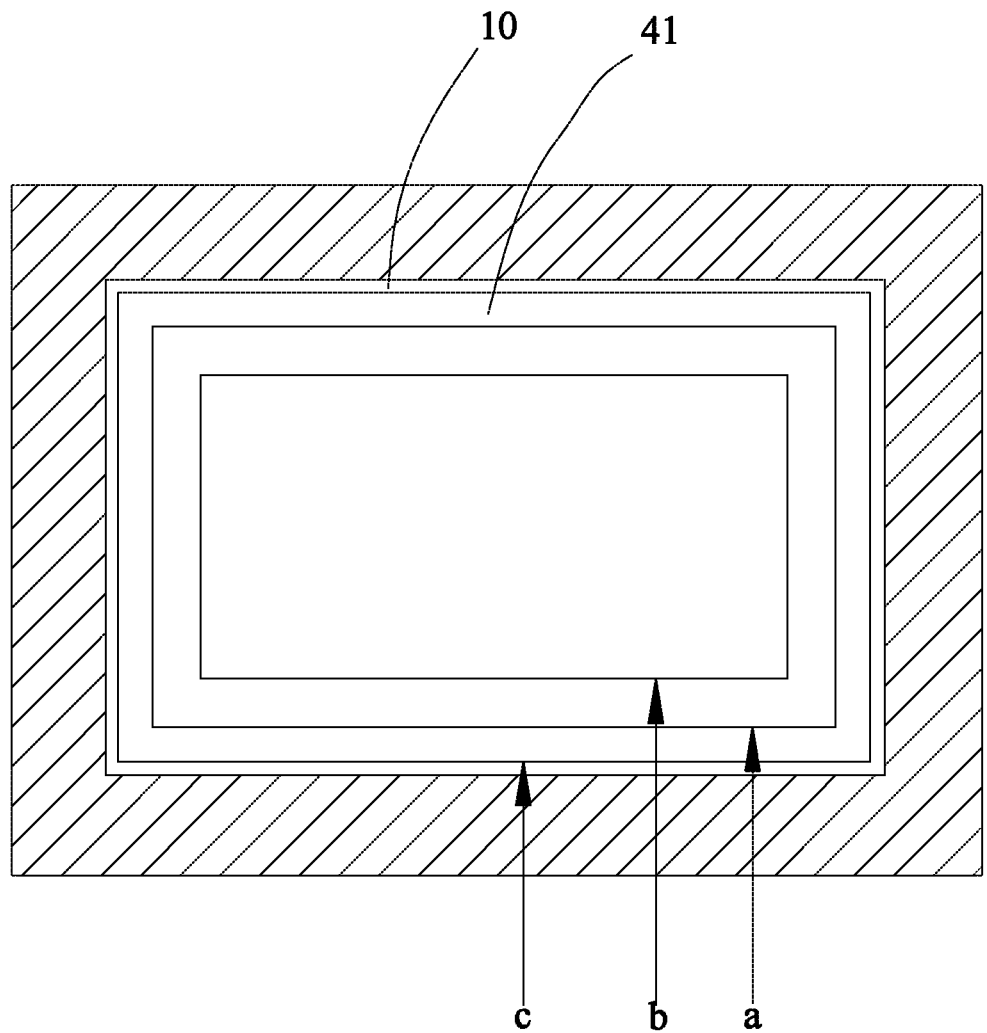
FIG. 4 is a schematic view illustrating a structure corresponding to a step S5 in the repairing method of the Mura in the display panel in accordance with one embodiment of the present disclosure.

In step S5, referring to FIG. 4, obtaining a width of a third predetermined pixel within the image captured by the CCD according to a difference between positions of the boundary "a" of the first white area and the boundary "b" of the second black area determined by a Mura compensating system, wherein the width of the third predetermined pixel is configured to be a difference between the width of the second predetermined pixel and the width of the first predetermined pixel.

For example, the width L1 of the long side of the first predetermined pixel is configured to be as 100 pixels, and the width L2 of the short-axis of the first predetermined pixel is configured to be as 100 pixels. The width L3 of the long side of the second predetermined pixel is configured to be as 200 pixels, and the width L4 of the short-axis of the second predetermined pixel is configured to be as 200 pixels. As such, a long side and a short axis side of the third predetermined pixel is configured to be as 100 pixels, and the width of the third predetermined pixel within the image captured by the CCD may be obtained according to the difference between the positions of the boundary "a" of the first white area and the boundary "b" of the second black area.

In step S6, obtaining a boundary of an actual-displaying image of the display panel, basing on a predetermined compensation area expanding outward from the boundary "a" of the first white area, according to the width of the third predetermined pixel within the image captured by the CCD, wherein the boundary of the actual-displaying image is configured to be as "c", and a width of the predetermined compensation area on the image captured by the CCD is determined by the width of the third predetermined pixel within the image captured by the CCD.

The predetermined compensation area is configured to be an area between the boundary "a" of the first white area and the boundary "c" of the actual-displaying image of the display panel. It is known that a width of the compensation area may be configured to be a plurality of pixels, however, a width of the compensation area in the image captured by the CCD is unknown. Thus, the above step S1 to step S5 is to determine the width of the compensation area in the image captured by the CCD.

In one example, the width of the long-axis, which is configured to be as 100 pixels, and the width of the short-axis, which is configured to be as 100 pixels, in the image captured by the CCD are obtained in step S5. As shown in FIG. 4, if the long side and the short side of the compensation area are configured to be as 100 pixels, the width of the third predetermined pixel may be the same of the width of the compensation area. In another example, the width of the compensation area may not be the same with the width of the third predetermined pixel, and the compensation area in the image captured by the CCD may be determined according to a proportional relation between the width of the compensation area and the width of the third predetermined pixel.

Figure 5:
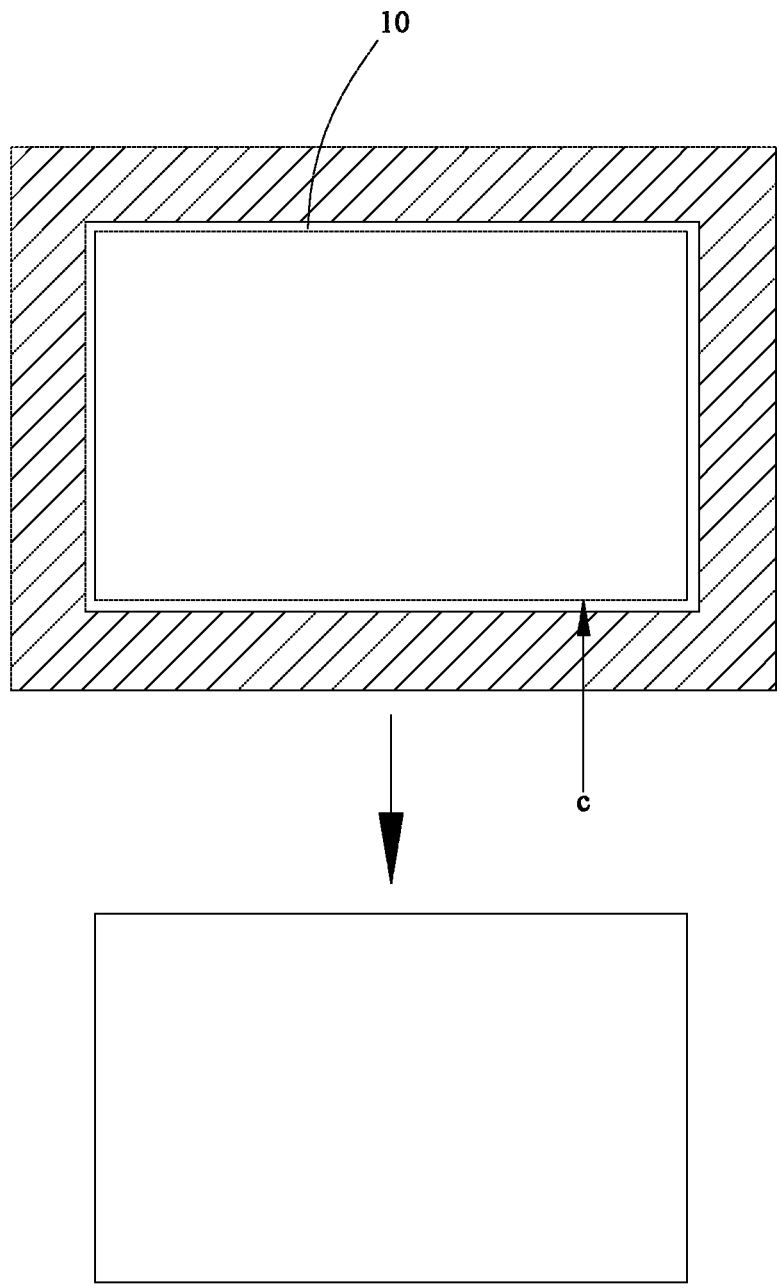
FIG. 5 is a schematic view illustrating a structure corresponding to a step S7 in the repairing method of the Mura in the display panel in accordance with one embodiment of the present disclosure.

In step S7, referring to FIG. 5, cutting the image captured by the CCD along the boundary "c" of the actual-displaying image by the Mura compensating system, obtaining the actual-displaying area, and conducting a Mura repairing process on the image which has been cut down.

As such, due to the Mura repairing process is conducted on an actual size of the display panel, accuracy and performance of the Mura compensation may be improved, and the Mura compensation may not be affected by the light leakage.

In view of the above, the present disclosure relates to the repairing method for the Mura in the display panel. The black area in the first image displayed in the display region of the display panel is configured to be the width of the first predetermined pixel, and the boundary "a" of the black area may be determined. The white area in the second image displayed in the display region of the display panel is configured to be the width of the second predetermined pixel, and the boundary "b" of the white area may be determined. Then, the Mura compensating system is configured to determine the boundary "c" of the actual-displaying region of the display panel according to the boundary "a" and the boundary "b". As such, the boundary "c" of the actual-displaying region of the display panel may be accurately determined even if the light leakage occurs at the rim of the display panel. That is, the incorrect Mura compensation resulting from the light leakage may be avoided, and the performance of the Mura compensation of the display panel may be improved.

All other embodiments obtained by a person of ordinary skill in the art based on the embodiments of the present disclosure without creative efforts shall fall within the protection scope of the present disclosure.

What is claimed is:

1. A repairing method for Mura in a display panel, comprising:

step S1, displaying a first image within a display region of the display panel when positioning the display region, wherein the first image comprises a rectangular-shaped first white area configured in a middle of the first image, and a rectangular-shaped first black area, the first black area comprises a rectangular ring having four band-shaped side, a width of a long side and a width of a short side of the first black area in the first image are configured to be a width of a first predetermined pixel;

step S2, determining a boundary of the first white area according to a dark-bright edge of the first image from an image captured by a charge couple device (CCD) and processed by the step S1, wherein the boundary of the first white area is configured to be as "a";

step S3, displaying a second image within the display region of the display panel, wherein the second image comprises a rectangular-shaped second black area configured in a middle of the second image, and a second white area, the second white area comprises the rectangular ring having four band-shaped side, a width of a long side and a width of a short side of the second white area in the second image are configured to be a width of a second predetermined pixel, and the width of the second predetermined pixel is different from the width of the first predetermined pixel;

step S4, determining a boundary of the second black area according to a dark-bright edge of the second image from the image captured by the CCD and processed by the step S3, wherein the boundary of the second black area is configured to be as "b";

step S5, obtaining a width of a third predetermined pixel within the image captured by the CCD according to a difference between positions of the boundary "a" of the first white area and the boundary "b" of the second black area "b" determined by a Mura compensating system, wherein the width of the third predetermined pixel is configured to be a difference between the width of the second predetermined pixel and the width of the first predetermined pixel;

step S6 obtaining a boundary of an actual-displaying image of the display panel, basing on a predetermined compensation area expanding outward from the boundary "a" of the first white area, wherein the width of the compensation area shown on the image captured by the CCD is determined by the width of the third predetermined pixel on the image captured by the CCD, wherein the boundary of the actual-displaying image is configured to be as "c";

step S7, cutting the image captured by the CCD along the boundary "c" of the actual-displaying image by the Mura compensating system, and conducting a Mura repairing process on the image which has been cut down.

2. The repairing method according to claim 1, wherein the width of the compensation area is the width of the third predetermined pixel.

3. The repairing method according to claim 1, wherein the width of the second predetermined pixel is twice as the width of the first predetermined pixel.

4. The repairing method according to claim 1, wherein a long side and a short side of the width of the first predetermined pixel are configured to be as 100 pixels.

5. The repairing method according to claim 4, wherein a long side and a short side of the width of the second predetermined pixel are configured to be as 200 pixels.

* * * * *